United States Patent [19]

Kawanabe et al.

[11] Patent Number: 4,843,550
[45] Date of Patent: Jun. 27, 1989

[54] METHOD OF INDICATING A SHIFT OPERATION OF A MANUAL GEARBOX OF A VEHICLE

[75] Inventors: Tomohiko Kawanabe; Masahiko Asakura; Noritaka Kushida; Shin'ichi Kubota; Yukihiro Matsumoto; Yasuhisa Arai; Takefumi Hosaka, all of Wako, Japan

[73] Assignee: Honda Giken Kogyo Kabushiki Kaisha, Tokyo, Japan

[21] Appl. No.: 12,320

[22] Filed: Feb. 9, 1987

[51] Int. Cl.$^4$ .................................................. G06F 7/02
[52] U.S. Cl. ........................................ 364/424.1; 74/686; 123/340; 364/508; 364/424.01
[58] Field of Search .......... 192/0.02 R, 0.4 C, 0.09 Z, 192/359; 74/865, 866; 364/424, 424.1, 505, 506, 508; 123/339, 353, 340

[56] References Cited
U.S. PATENT DOCUMENTS

| | | | |
|---|---|---|---|
| 2,751,580 | 6/1956 | Stump | 324/161 |
| 4,281,751 | 8/1981 | Suga et al. | 192/3.59 |
| 4,294,341 | 10/1981 | Swart | 192/103 R |
| 4,458,318 | 7/1984 | Smit et al. | 364/424.1 |
| 4,471,438 | 9/1984 | Futagi et al. | 364/424.1 |
| 4,517,859 | 5/1985 | Nagadea et al. | 74/866 |

*Primary Examiner*—Parshotam S. Lall
*Assistant Examiner*—Ngoc Pham
*Attorney, Agent, or Firm*—Birch, Stewart, Kolasch & Birch

[57] ABSTRACT

A method of indicating when a shift operation of a manual gearbox is to be preformed includes a step for comparing a detected vehicle speed with a reference vehicle speed which is determined and changed on the basis of a detected engine operational parameter and a step for indicating that the shift operation should be performed on the basis of a result of the comparison. The reference vehicle speed is corrected to a lower speed in response to an increase of a total running time of the vehicle, thereby to maintain the driveability of the vehicle when the running time of the vehicle is short.

6 Claims, 14 Drawing Sheets

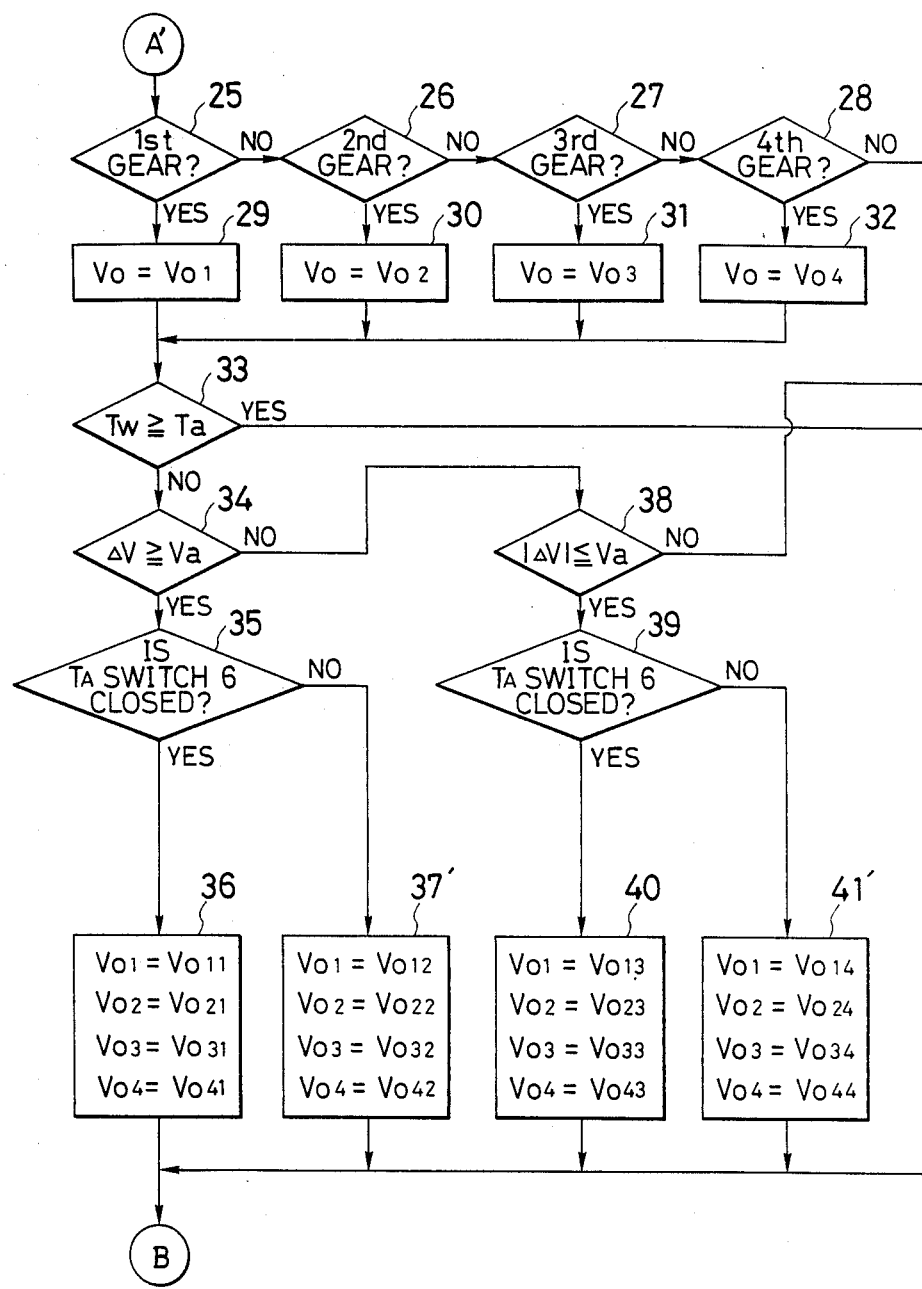

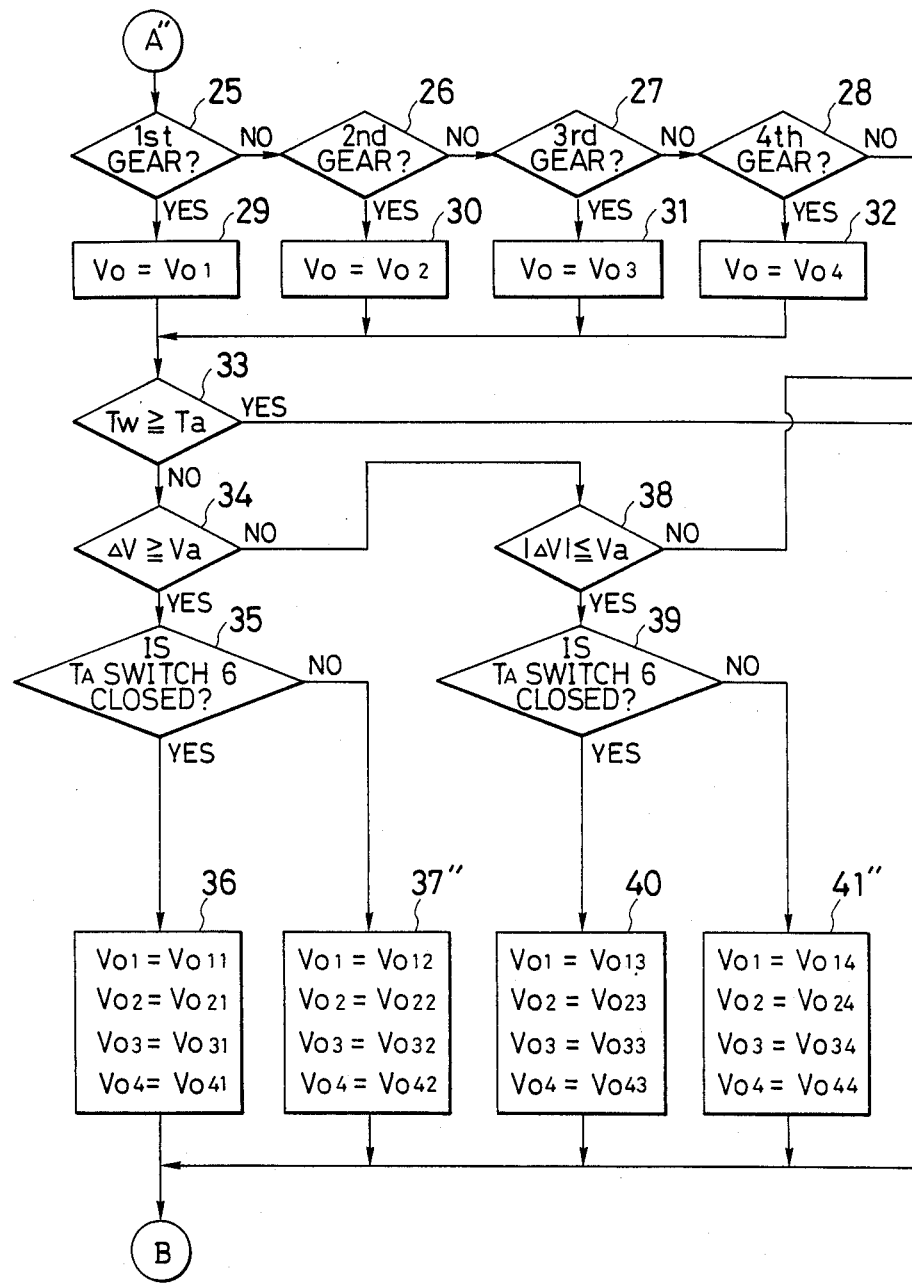

METHOD OF INDICATING A SHIFT OPERATION OF A MANUAL GEARBOX OF A VEHICLE

BACKGROUND OF THE INVENTION

1. Field of the Invention

The present invention relates to a method of indicating desirability of a shift operation to be performed on a manual gearbox, and more particularly to a method which senses a state of the vehicle operation (including the engine operation) requiring a shift operation of the manual gearbox and indicates the necessity of the shift operation of the manual gearbox.

2. Description of Background Information

By suitably selecting the gear position of a manual gearbox of a vehicle in accordance with a parameter of the vehicle operation such as the load applied to the vehicle, the fuel consumption in a preselected running mode of the vehicle, as well as in the actual running condition after the vehicle has been brought into service, can be improved. Conventionally, various methods for indicating a desirable gear position have been proposed. For example, Japanese Patent Application Laid Open Number 55-31671 discloses a method in which the rotational speed of the engine and the throttle position are monitored, and gearbox operation requiring an up-shift operation or a down-shift operation is indicated according to the monitored rotational speed of the engine and the throttle position.

Japanese Utility Model Publication No. 55-34283 discloses a method in which an integration value of the distance covered by the vehicle (mileage) or the running time of the engine is detected in order to compensate for a time-induced change of the indication operation.

On the other hand, it is known that the driveability of a new car is not as good as the driveability of a car which has passed a breaking-in period, because of frictional losses of the engine and power transmission system. Further, it has been experienced that the running-in period can be completed sooner as the frequency of a high speed drive of the engine increases, even though the same distance is covered by the vehicle.

Therefore, if a reference value used to indicate a shift operation of a manual gearbox, such as a reference speed level, is determined for a new car before the breaking-in period to be the same as the level for a car which has already passed the breaking-in period, it would cause the use of an undesirably low speed range of engine rotation. Thus, the driveability of the vehicle would be deteriorated in such a case.

In addition, it is conceivable to raise the reference vehicle speed of an up-shift operation as the engine temperature decreases. However, when the temperature of the engine is very low, raising of the reference vehicle speed depending on a total running time of the vehicle would rather cause an adverse effect on the driveability of the vehicle.

OBJECT AND SUMMARY OF THE INVENTION

An object of the present invention is therefore to provide a method of indicating a shift operation of a manual gearbox, by which vehicle deterioration of the driveability can be avoided even if the method is applied to a new vehicle (i.e., the break-in period is not performed).

Another object of the present invention is to provide a method of indicating a shift operation of a manual gearbox, in which the reference vehicle speed values for determining a shift operation of the manual gear box are changed to proper values sufficiently rapidly, so that both of the fuel economy and the driveability of the vehicle are secured.

According to the present invention, a method of indicating a shift operation of a manual gearbox comprises a step for detecting an operational parameter of the vehicle engine, a step for determining a reference vehicle speed in response to a detected operational parameter of the engine, a step for indicating the shift operation on the basis of a result of a comparison between the detected vehicle speed and the reference vehicle speed, and a step for detecting a running time of the vehicle, and correcting the reference vehicle speed to a lower speed in response to an increase in a detected running time of the vehicle.

According to another aspect of the invention, a shift operation of a manual gearbox comprises a step for detecting an operational parameter of the engine, a step for determining a reference vehicle speed in accordance with a detected operational parameter of a engine, a step for indicating the shift operation on the basis of a result of a comparison between a detected vehicle speed and the reference vehicle speed, and a step for integrating the number of engine rotations and correcting the reference vehicle speed to a lower speed in response to the increase in the integrated number of engine rotations.

According to a further aspect of the invention, a shift operation of a manual gearbox comprises a step for detecting an operational parameter of the engine, a step for determining a reference vehicle speed in accordance with a detected operational parameter of the engine, a step for indicating the shift operation on the basis of a result of a comparison between a detected vehicle speed and the reference vehicle speed, and a step for integrating the number of shift operations of the manual gear box, and correcting the reference vehicle speed to a lower speed in response to an increase in the integrated number of shift operations.

BRIEF DESCRIPTION OF THE DRAWINGS

FIG. 2C is a diagram illustrating the juxtaposition of FIGS. 2C(a) and 2C(b);

FIG. 3B is a diagram illustrating the juxtaposition of FIGS. 3B(a) and 3B(b);

FIG. 5C is a diagram illustrating the juxtaposition of FIGS. 5C(a) and 5C(b).

DETAILED DESCRIPTION OF THE PREFERRED EMBODIMENTS

Figure 1:
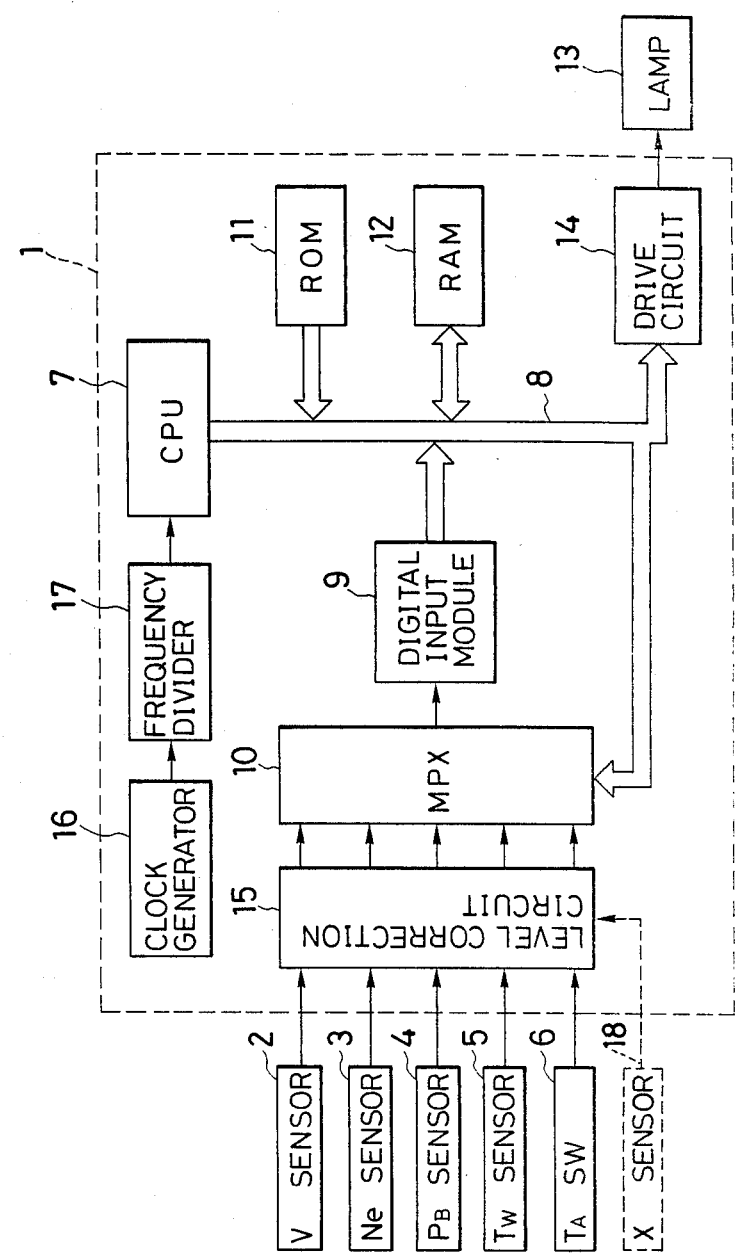
FIG. 1 is a block diagram showing the construction of a control system in which the indication method according to the present invention is adopted.

The embodiment of the shift operation indication method according to the present invention will be explained with reference to FIG. 1 of the accompanying drawings showing a control system in which the shift operation indication method of the present invention is embodied.

As shown, the control system includes a control circuit 1 which comprises a microcomputer. The control circuit 1 is supplied with output signals from various sensors such as a vehicle speed sensor 2, an engine rotational speed sensor 3, vacuum sensor 4, a cooling water temperature sensor 5, and an output signal of an intake air temperature switch ($T_A$ switch) 6. The vehicle speed sensor 2 produces an output signal in the form of a pulse train whose frequency corresponds to the vehicle speed V. The vehicle speed sensor 2 for example consists of a reed switch provided in a speedometer (not shown) as is generally known in the art, and which generates four pulses every one revolution of a speedometer cable. The engine rotational speed sensor 3 generates, for example, a pulse train whose frequency corresponds to the engine rotational speed Ne, in synchronism with the ignition timing of the internal combustion engine (not shown) on which this control system is provided. The vacuum sensor 4 generates an analog output signal whose level corresponds to a vacuum pressure $P_B$ in an intake pipe of the internal combustion engine, downstream of the throttle valve. The cooling water temperature sensor 5 generates an analog output signal whose level corresponds to the temperature $T_W$ of the cooling water of the engine. The intake air temperature switch 6 is provided for detecting the temperature of the intake air in the intake pipe of the engine, and turns on (closes) when the temperature $T_A$ in the intake pipe becomes lower than a reference intake air temperature Tb (of 15° C., for example).

The control circuit 1 has a CPU 7 (central processing unit) which performs digital calculation operations. The CPU 7 is provided with an input/output bus 8 through which data signals and address signals are input or output to the CPU 7. To the input/output bus 8, there are connected a digital input module 9, an MPX (multiplexer) 10, a ROM (read only memory) 11, a RAM (random access memory) 12, and a drive circuit 14 for driving an indication lamp 13 which indicates, for example, the desirability of an up-shift operation of the manual gearbox. The MPX 10 is a switch for selectively transmitting one of the output signals of sensors 2-5 and the output signal of the $T_A$ switch 6 supplied from a level correction circuit 15 to the digital input module 9 in accordance with a command from the CPU 7. The RAM 12 stores data representing a count value of counting the pulses from the vehicle speed sensor 2, as counted by CPU 7, and is constructed as a back-up RAM. Thus, the count value of the counter in the RAM 12 represents an integrated traveling distance (mileage) of the vehicle. To the CPU 7, there is supplied, through a frequency divider 17, a clock pulse signal from a clock generator 16. Further, the CPU 7 also operates as a timer $T_0$, which timer $T_0$ is designed as a downcounter which starts downcounting every time it is reset.

With this construction, the control circuit 1 performs a control operation in which the operational state of the vehicle is determined from the output signals of the sensors 2-5 and the switch 6 and the necessity of an up-shift operation of the manual gearbox is indicated to a driver of the vehicle, by driving the lamp 13, in accordance with a program which will be described later.

The steps of the shift operation indication method according to the present invention, which are performed by the control circuit 1, will be explained with reference to operational flowcharts of FIG. 2A through FIG. 2D.

Figure 2A:
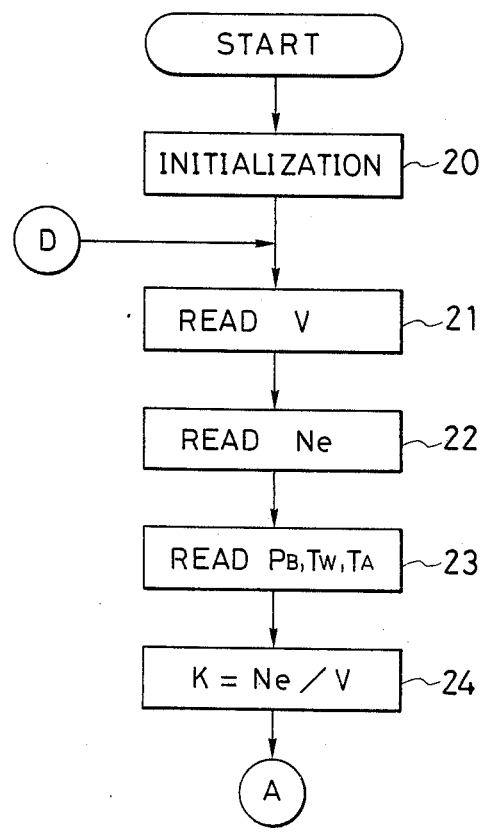
FIGS. 2A, 2B, 2C(a), 2C(b) and 2D are flowcharts illustrating steps of the shift operation indication method of the present invention.

As shown in FIG. 2A, an initialization is executed at a step 20. After initialization, the program starts repeatedly at predetermined intervals (every 20m sec, for example) and the vehicle speed V stored in the RAM 12 is read out at a step 21. Subsequently, the engine rotational speed Ne which has been stored in the RAM 12 in a similar manner, is read out at a step 22. The vehicle speed V and the engine rotational speed Ne are stored in the RAM 12 in the following manner. The pulse signal from the vehicle speed sensor 2 is supplied to the CPU 7 as an interruption signal. Each time of the application of the interruption signal, the CPU 7 measures an interval between the present pulse signal received from speed sensor 2 and a preceding pulse signal. The CPU 7 then calculates an average value of a predetermined number (for example, four corresponding to one revolution of a speed meter cable) of the measured intervals, and stores the thus calculated average value in the RAM 12. The pulse signal of the rotational speed (Ne) sensor 3 is also supplied to the CPU 7 as an interruption signal, and an average value of the rotational speed is stored in the RAM 12 in a manner similar to the processing of the output signal of the vehicle speed sensor 2. That is, the average rotational speed is calculated by dividing the integral value of the rotational speed by the number of pulses from sensor 3. Subsequently, the CPU 7 performs the reading of the analog output signals of the $P_B$ sensor 4 and the $T_W$ sensor 5, and the on/off output signal of the $T_A$ switch 6 at a step 23, and a calculation of the gear position K (K = Ne/V) at a step 24, at intervals (for example, 400m sec) longer than the interval of the starting of the program. The gear position K is defined as the ratio of engine rotational speed to vehicle speed and should not be confused with the gear ratio of the various gears.

Figure 2B:
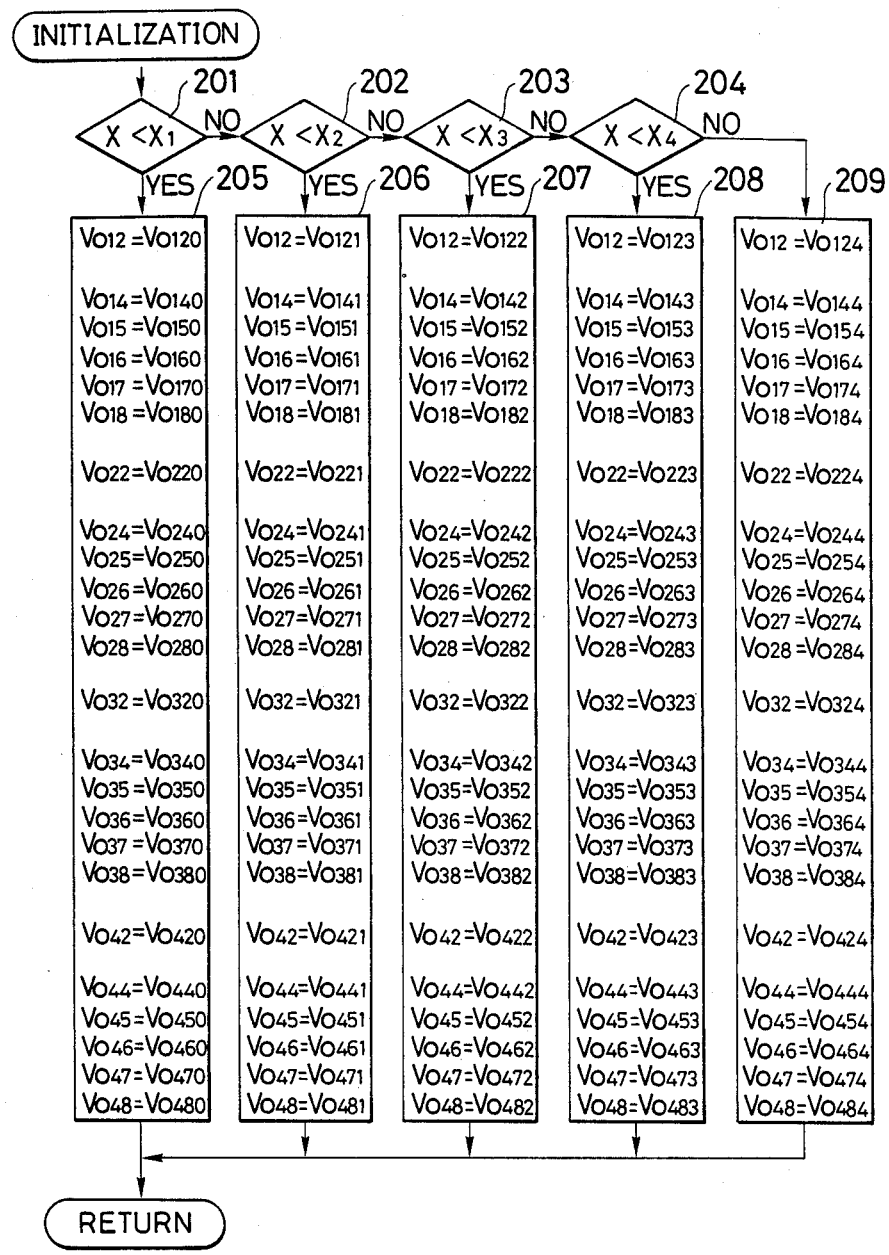

The initialization at the step 20 is executed as follows. First, a detection as to the running time of the vehicle is executed according to the integrated mileage X of the vehicle. As shown in FIG. 2B, whether or not the integrated mileage X of the vehicle is shorter than a reference mileage $X_1$ (1000 miles, for example) is detected at a step 201. Further, the integrated mileage X is compared with reference mileage values $X_2$ (2000 miles, for example), $X_3$ (3000 miles, for example), and $X_4$ (3700 miles, for example) in a similar manner, at steps 202 through 204 respectively in the case that the integrated mileage X is greater than each respective reference mileage value. Generally, the frictional losses of the power transmission system will reach a stable level after driving about 4000 miles. After the detection of the running time of the vehicle, each data value of reference vehicle speed values $V_{012}$, $V_{014}$ through $V_{018}$, $V_{022}$, $V_{024}$ through $V_{028}$, $V_{032}$, $V_{034}$ through $V_{038}$, $V_{042}$, and $V_{044}$ through $V_{048}$, corresponding to each driving mode of the vehicle, and each gear position are set at steps 205 through 209 respectively, by using values previously stored in ROM 11, for example, as shown in FIG. 2B, for each integrated running time of the vehicle. The reference vehicle speed values $V_{012}$, $V_{014}$ through $V_{018}$, $V_{022}$, $V_{024}$ through $V_{028}$, $V_{032}$, $V_{034}$ through $V_{038}$, $V_{042}$, and $V_{044}$ through $V_{048}$, are determined such that their values are lowered as the integrated mileage X of the vehicle increases. Although the reference vehicle speed values are set to be stepwise in the above example, it is also possible to determine those values so that they vary in a continuous manner in response to the integrated mileage of the vehicle. Further, regarding the reference vehicle speed values $V_{011}$, $V_{021}$, $V_{031}$ and $V_{041}$, $V_{013}$, $V_{023}$, $V_{033}$ and $V_{043}$ corresponding to a particular operational mode of the vehicle, the determination of data values according to the running time of the vehicle will not be performed.

In the above example, the setting of the reference vehicle speed values in response to the running time of the vehicle is performed in the initialization routine (step 20). However, it is also possible to design the setting of the reference speed values to be performed in the main loop of the calculation subsequent to the step 24, so that the setting of the reference speed values is performed at a low frequency of, for example, once every thousand times of the execution of the main loop.

Figure 2C:
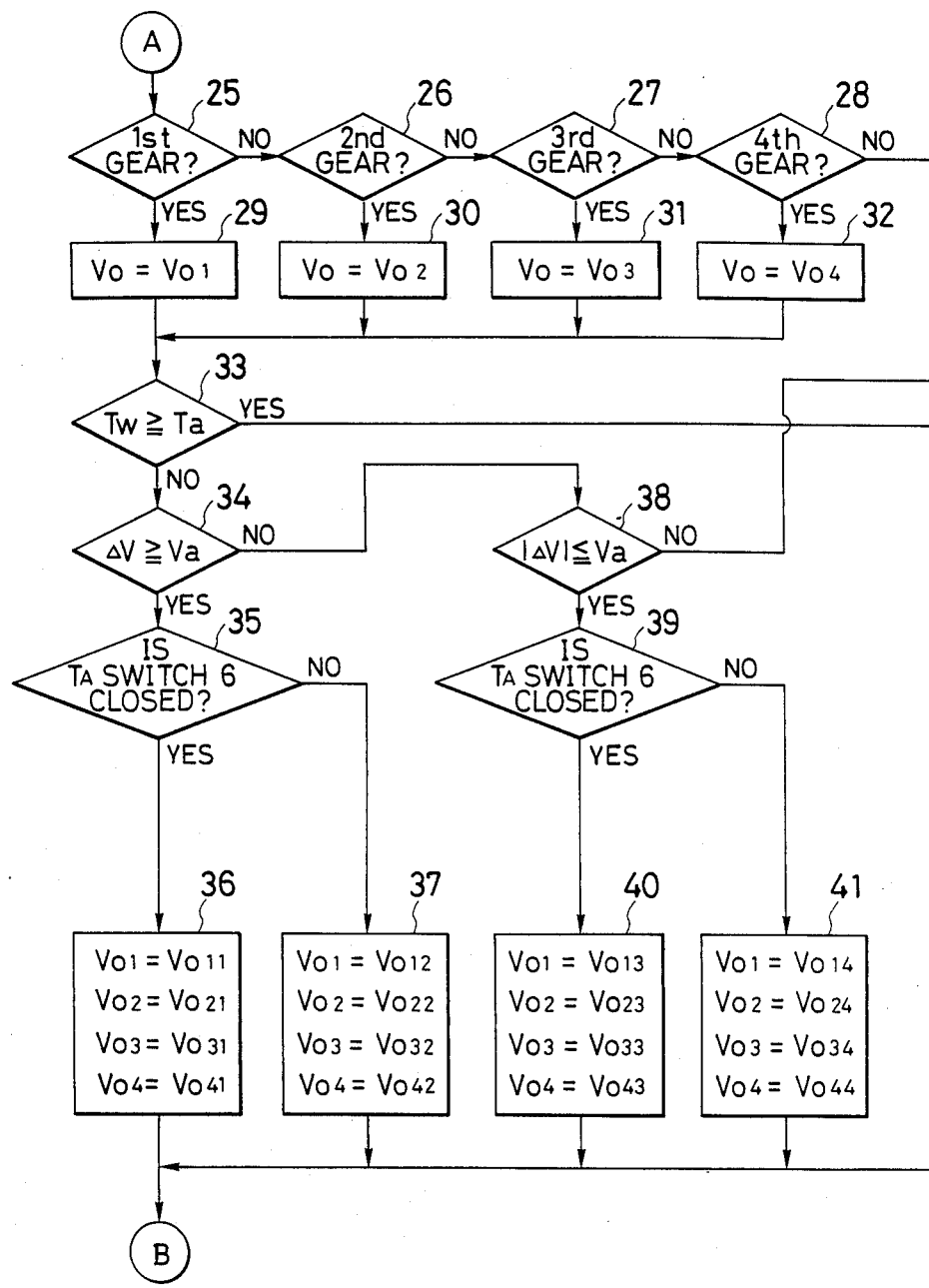
Figure 2C:
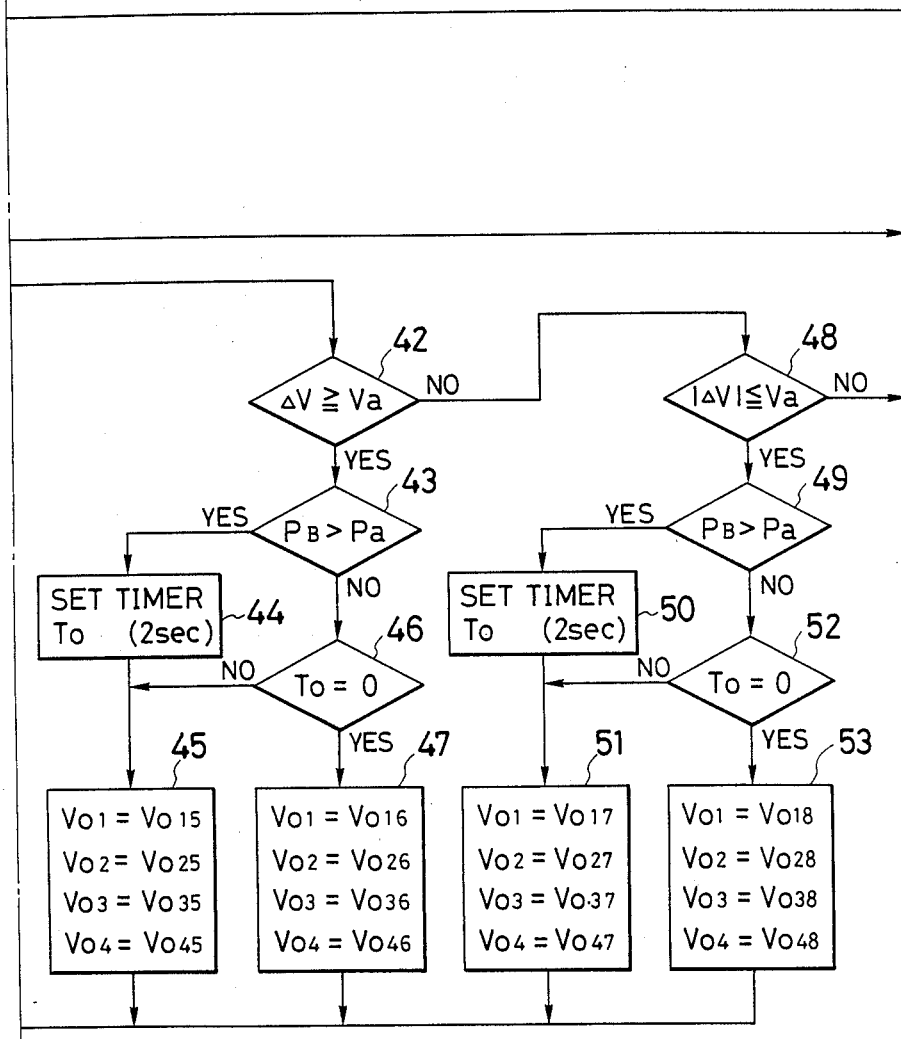

Subsequently, as shown in FIG. 2C(a) and 2C(b), the present gear position is detected by determining whether or not the value K is in predetermined ranges at steps 25 through 28, and the reference vehicle speed value $V_0$ ($V_{01}$ through $V_{04}$) is set for each of the gear positions, at steps 29 through 32. Then, whether or not the engine cooling water temperature $T_W$ is equal to or higher than a predetermined first reference temperature level Ta (75° C., for example) is detected at a step 33. If $T_W \geq Ta$, operation of what is called a HOT mode will be selected and if $T_W < Ta$, an operation of what is called a COLD mode will be selected.

In the operation of the COLD mode ($T_W < Ta$), whether or not a difference $\Delta V$ between the present value of the vehicle speed V and a preceding value of the vehicle speed V, is greater than a predetermined value Va (0.5 mile/h) is detected at a step 34. If $\Delta V \geq Va$, the vehicle is accelerating, and whether or not the intake air temperature switch ($T_A$ switch) 6 is turned on (closed), i.e. whether or not the intake air temperature $T_A$ is lower or equal to a predetermined reference intake air temperature Tb (15° C., for example) is detected at a step 35. If the $T_A$ switch 6 is closed (in the ON position) the data values $V_{011}$, $V_{021}$, $V_{031}$, and $V_{041}$ are in turn set at a step 36, by using values previously stored in ROM 11 for example, as the reference vehicle speed values $V_{01}$ through $V_{04}$. On the other hand, if the $T_A$ switch 6 is open (in the OFF position), the data values $V_{012}$, $V_{022}$, $V_{032}$, and $V_{042}$ which have been determined at one of the steps 205 through 209 in accordance with the running time of the vehicle, are in turn set at a step 37, as the reference vehicle speed values $V_{01}$ through $V_{04}$. In addition, the data values $V_{011}$, $V_{021}$, $V_{031}$, and $V_{041}$ used at the step 36 are determined to be higher than the data values $V_{012}$, $V_{022}$, $V_{032}$, and $V_{042}$ used at the step 37, respectively.

On the other hand, if it is detected that $\Delta V$ is smaller than the predetermined value Va ($\Delta V < Va$) at the step 34, whether or not an absolute value $|\Delta V|$ is equal to or smaller than the predetermined value Va, is detected at a step 38. If $|\Delta V| \leq Va$, the vehicle is cruising, and whether or not the $T_A$ switch 6 is closed is detected at a step 39. If the $T_A$ switch is closed, the data values $V_{013}$, $V_{023}$, $V_{033}$, and $V_{043}$ are in turn set at a step 40, from values previously stored in ROM 11 as the reference vehicle speed values $V_{01}$ through $V_{04}$. On the other hand, if the $T_A$ switch 6 is open, the data values $V_{014}$, $V_{024}$, $V_{034}$, and $V_{044}$ which have been determined at one of the steps 205 through 209 in accordance with the running time of the vehicle are in turn set at a step 41, as the reference vehicle speed values $V_{01}$ through $V_{04}$. In addition, the data values $V_{013}$, $V_{023}$, $V_{033}$, and $V_{043}$ set at the step 40 are determined to be higher than the data values $V_{014}$, $V_{024}$, $V_{034}$, and $V_{044}$ set at the step 41, respectively.

In the operation of the HOT mode ($T_W \geq Ta$), whether or not the difference $\Delta V$ is greater than the predetermined value Va is detected as in the case of the operation of the COLD mode, at a step 42. If $\Delta V \geq V_a$, the vehicle is accelerating, and whether or not the vacuum pressure $P_B$ is smaller than a predetermined pressure Pa ($-150$mmHg, for example) is detected at a step 43. If the vacuum pressure $P_B$ is larger than the predetermined pressure Pa ($P_B > Pa$), it means that the vehicle is accelerating rapidly, and the timer $T_0$, of 2 seconds for example, is set at a step 44. Then data values $V_{015}$, $V_{025}$, $V_{035}$, and $V_{045}$ which have been determined at one of the steps 205 through 209 in accordance with the running time of the vehicle, are in turn set at a step 45, as the reference vehicle speed values $V_{01}$ through $V_{04}$. On the other hand, if $P_B \leq Pa$, it means that the vehicle is accelerating gradually, and whether or not the count value of the timer $T_0$ is equal to zero ($T_0 = 0$), that is, whether or not 2 seconds have lapsed after the transition from the rapid accelerating condition to the slow accleration condition, is detected at a step 46. If $T_0 \neq 0$, there is a possibility that rapid acceleration is occuring, and the program goes to the step 45. On the other hand, if $T_0 = 0$, the data values $V_{016}$, $V_{026}$, $V_{036}$, and $V_{046}$ which have been determined at one of the steps 205 through 209 in accordance with the running time of the vehicle, are in turn set at a step 47, as the reference vehicle speed values $V_{01}$ through $V_{04}$. In addition, the data values $V_{015}$, $V_{025}$, $V_{035}$ and $V_{045}$ set at the step 45 are determined to be higher than the data values $V_{016}$, $V_{026}$, $V_{036}$ and $V_{046}$ set at the step 47, respectively.

If it is detected that the difference $\Delta V$ is smaller than the Va ($\Delta V < Va$) at the step 42, then whether or not the absolute value $|\Delta V|$ is equal to or smaller than the value Va ($|\Delta V| \leq Va$) is detected at a step 48. If $|\Delta V| \leq Va$, the vehicle is cruising, and whether or not the vacuum pressure $P_B$ is smaller than the predetermined value Pa ($-150$ mmHg) is detected at a step 49. If the vacuum $P_B$ is larger than the predetermined value ($P_B > Pa$), the timer $T_0$ of 2 second is set at a step 50. Subsequently, the data values $V_{017}$, $V_{027}$, $V_{037}$ and $V_{047}$ which have been determined at one of the steps 205 through 209 in accordance with the running time of the vehicle, are in turn set at a step 51, as the reference vehicle speed values $V_{01}$ through $V_{04}$. On the other hand, if $P_B \leq Pa$, whether or not the count value of the timer $T_0$ is equal to zero ($T_0 = 0$), is detected at a step 52. If $T_0 \neq 0$, the program goes to the step 51. On the other hand, if $T_0 = 0$, the data values $V_{018}$, $V_{028}$, $V_{038}$ and $V_{048}$ are in turn set at a step 53, as the reference vehicle speed values $V_{01}$ through $V_{04}$. In addition, the data values $V_{017}$, $V_{027}$, $V_{037}$, and $V_{047}$ set at the step 51 are determined to be higher than the data values $V_{018}$, $V_{028}$, $V_{038}$, and $V_{048}$ set at the step 53, respectively.

Through the above described steps for determining the reference vehicle speed values $V_{01}$ through $V_{04}$, the reference vehicle speed values $V_{01}$ through $V_{04}$ for the COLD mode ($T_W < Ta$) are determined to be higher than the reference vehicle speed values $V_{01}$ through $V_{04}$ for the HOT mode ($T_W \geq Ta$). Further, if the intake air temperature $T_A$ is lower than the predetermined reference intake air temperature Tb which is set to be lower than the first reference engine temperature Ta in the COLD mode, the reference vehicle speed values $V_{01}$ through $V_{04}$ are determined to be still higher.

As already explained in connection with the steps 205 through 209, the determination of data values according to the running time of the vehicle will not be performed for the reference vehicle speed values $V_{011}$, $V_{021}$, $V_{031}$ and $V_{041}$, $V_{013}$, $V_{023}$, $V_{033}$ and $V_{043}$ corresponding to a particular operational mode of the vehicle, that is, a period of very low engine temperature, in which $T_A$ is lower than Tb ($T_A < Tb$). Therefore, the correction of the reference vehicle speed values to a higher speed on the basis of the running time of the vehicle (what is called a running-in correction) will not be performed when the engine temperature is very low. However, the reference vehicle speed values are sufficiently high when the engine is operating with a very low temperature, and the driveability of the vehicle is secured without effecting the running-in correction.

Figure 2D:
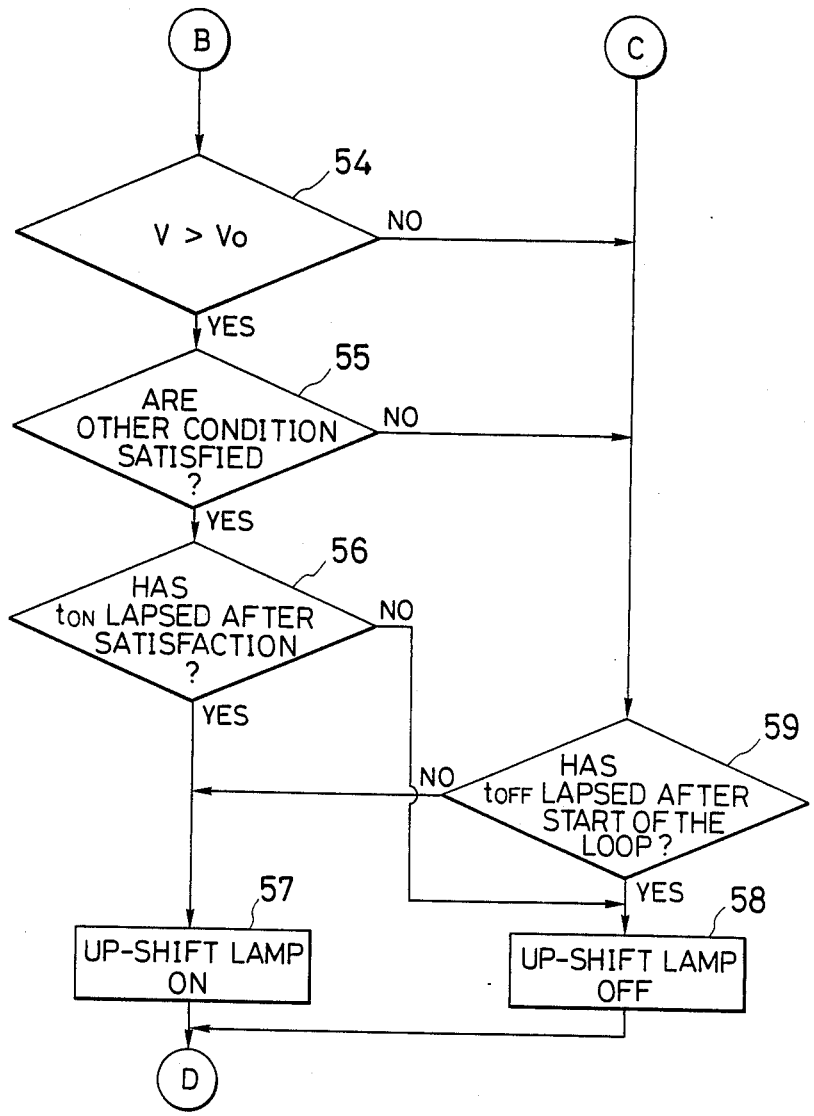

After determining the reference vehicle speed values $V_{01}$ through $V_{04}$ for each gear position (1st gear through 4th gear), whether or not the vehicle speed V in each gear position is higher than the reference vehicle speed value $V_0$ ($V_{01}$ through $V_{04}$) is detected at a step 54, as depicted in FIG. 2D. If the vehicle speed V is higher than the reference vehicle speed value $V_0$ ($V > V_0$), whether or not other conditions for the up-shift operation are satisfied is detected at a step 55. If other conditions are satisfied, it means that the vehicle is operating under a condition in which the up-shift operation of the transmission gear is required, and whether or not a predetermined time period $t_{ON}$ has lapsed after the conditions have been satisfied is detected at a step 56. The period $t_{ON}$ is defined to prevent the up-shift lamp from coming on if the operator has already shifted the manual gear box. If the predetermined time period $t_{ON}$ has lapsed, a drive command is supplied to the drive circuit 14, to turn on the up-shift indication lamp 13, at a step 57. If the predetermined time period $t_{ON}$ has not lapsed, a lamp drive stop command is supplied to the drive circuit 14, to turn off the up-shift indication lamp 13. This means that the up-shift indication lamp 13 will not be turned-on if the conditions for the up-shift operation do not become no more satisfied within the predetermined time period $t_{ON}$ after the satisfaction of the conditions.

On the other hand, the program goes to a step 59 to detect whether or not a predetermined time period $t_{OFF}$ has lapsed after the program entered the loop, when the gear position is detected to be other than the first through fourth gears, i.e. the transmission gear is at the neutral position or the fifth gear, at the steps 25 through 28, under conditions such as when the absolute value $|\Delta V|$ is larger than the predetermined value Va ($|\Delta V| > Va$), i.e. when the vehicle is decelerating, at the step 38 or 48, when the vehicle speed V is detected to be equal to or smaller than the predetermined vehicle speed value $V_0$ ($V \leq V_0$) at the step 54, or when it is detected that the other conditions for the up-shift operation are not all satisfied, at the step 55. If the predetermined time period $t_{OFF}$ has lapsed, the program goes to the step 58, to stop the driving of the up-shift indication lamp 13. The period $t_{OFF}$ is defined to take into account a transient condition caused by deceleration, switching to neutral, etc. If the predetermined time period $t_{OFF}$ has not lapsed, the programs goes to the step 57, continuing to drive the up-shift indication lamp 13.

If the predetermined time period $t_{OFF}$ is set to be shorter than the predetermined time period $t_{ON}$, the frequency of the driving of the up-shift indication lamp 13 will be reduced. However, the reduced time periods in which the up-shift indication will otherwise take place are not the most appropriate time periods for the up-shift operation. Therefore, in the above case, stopping the drive of the up-shift indication lamp 13 has an effect to enforce a driving manner by which the manual gearbox is up-shifted always at an appropriate time.

In the above described embodiment, pulse signals from the vehicle speed sensor 2 are supplied to the counter in the RAM 12, and the integrated mileage X of the vehicle is detected on the basis of the count value of the counter in the RAM 12, so as to obtain the running time of the vehicle. However, as illustrated by the dashed line of FIG. 1, it is possible to provide an X sensor 18 for solely detecting the integrated mileage X of the vehicle, so that the running time of the vehicle can be determined by an output signal of the X sensor 18. In that case, the reading of the output signal of the X sensor 18 in analog form may be executed in a step at the beginning of the initialization, and the read value may be suitably used in the operation of FIG. 2B. Further, the reading of the output signal may be performed at the step 23, and the read value may be used once every predetermined number of calculating cycles. As an example, the X sensor 18 may utilize a structure including a potentiometer associated with an odometer of the vehicle. More specifically, it is possible to construct so that a brush of the potentiometer is rotated as the rotation of an indicator (or dial) wheel of the odometer which indicates the highest (most significant) digit.

It will be appreciated from the foregoing, in the case of the above described embodiment of the indication method according to the present invention, reference vehicle speed values are shifted to a lower speed as the running time of the vehicle increases. Therefore, the deterioration of the driveability of the vehicle can be avoided also for a new car in which the break-in period is not performed.

Figure 3A:
FIGS. 3A, 3B(a), and 3B(b) are flowcharts illustrating steps of a second embodiment of the indication method.
Figure 3B:
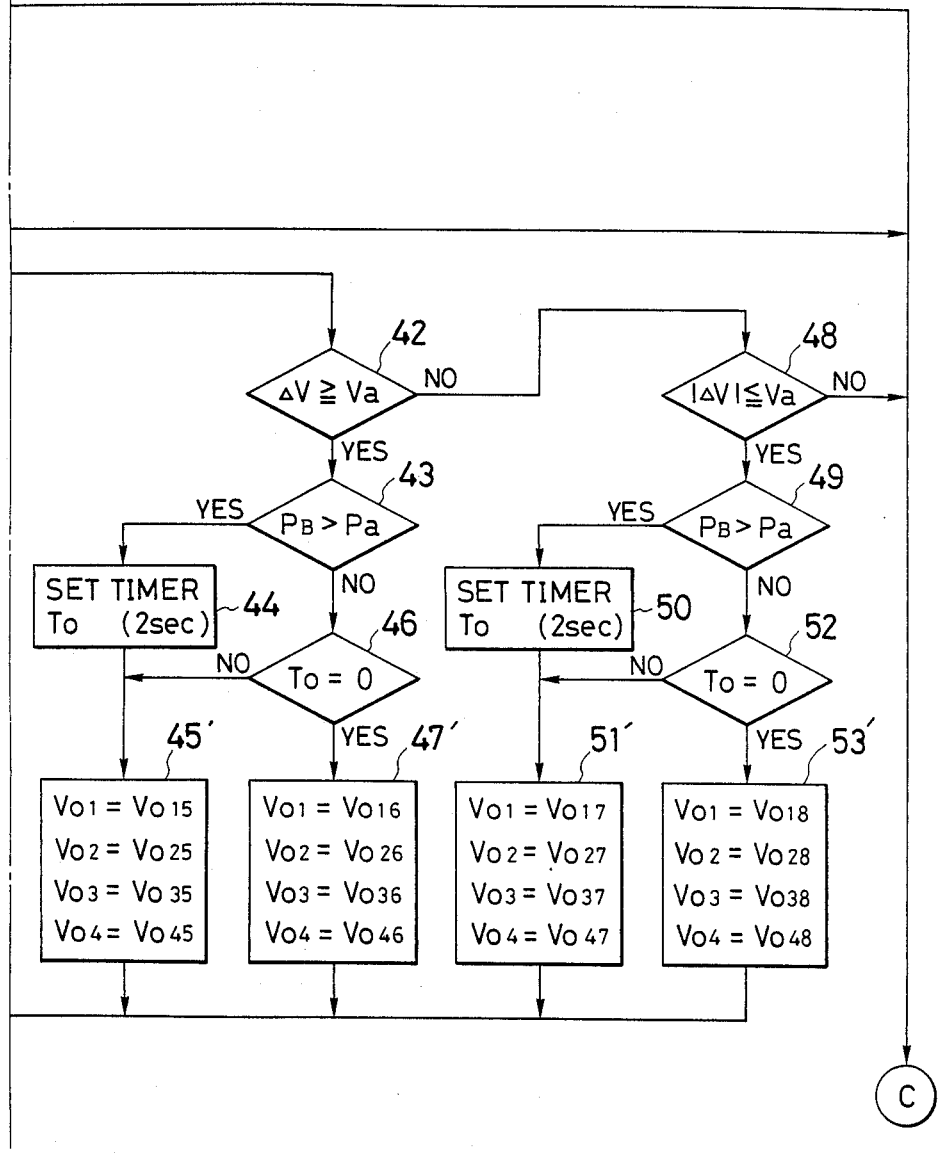

Referring to FIGS. 3A, 3B(a) and 3B(b), the second embodiment of the present invention will be explained hereinafter.

In the second embodiment, the up-shift indication operation is performed by a control circuit which is constructed in the same manner as the control circuit shown in FIG. 1. Therefore, the explanation of the control circuit will not be repeated.

FIG. 3A shows a part of the steps of the second embodiment in which the operations shown in FIGS. 2A and 2D of the previous embodiment are also perfomed. Therefore, the explanation of those steps will not be repeated. After the calculation of the gear position K at the step 24, an integrated value of the number of engine revolution obtained from the count value in the counter of the RAM 12 will be compared with several reference values. At first, whether or not the integrated value of the number of engine rotations N is smaller than a reference value $N_1$ (4.6million revolutions, for example) is detected at a step 251. Further, the integrated value of the engine rotations N is compared with reference values $N_2$ (9.2million revolutions, for example), $N_3$ (13.8 million revolutions, for example), and $N_4$ (17 millions, for example) in a similar manner, at steps 252 through 254 respectively. After the comparison of the integrated value of engine revolutions, each data value of reference vehicle speed values $V_{012}$, $V_{014}$ through $V_{018}$, $V_{022}$, $V_{024}$ through $V_{028}$, $V_{032}$, $V_{034}$ through $V_{038}$, $V_{042}$, and $V_{044}$ through $V_{048}$, corresponding to each driving mode of the vehicle, and each gear position are set by using values $V_{01200}$, $V_{0140}$, $V_{0180}$, at steps 255 through 259 respectively, as shown in FIG. 3A, for each integrated value of engine revolutions. The reference vehicle speed values $V_{012}$, $V_{014}$ through $V_{018}$, $V_{022}$, $V_{024}$ through $V_{028}$, $V_{032}$, $V_{034}$ through $V_{038}$, $V_{042}$, and $V_{044}$ through $V_{048}$, are determined such that their values are lowered as the integrated value of the engine revolutions N increases. Although the reference vehicle speed values are set to be stepwise in the above example, it is also possible to determine those values so that they vary in a continuous manner in response to the integrated value of the engine revolutions N. Further, regarding the reference vehicle speed values $V_{011}$, $V_{021}$, $V_{031}$ and $V_{041}$, $V_{013}$, $V_{023}$, $V_{033}$ and $V_{043}$ corresponding to a particular operational mode of the vehicle using values previously stored in Rom 11 the determination of data values according to the integrated value of engine revolutions N will not be performed.

After the determination of the reference vehicle speed values at steps 251 through 259, the program goes to the step 25 of FIG 3B(a) so that operations which are the same as the operations shown in FIGS. 2C(a), 2C(b), and 2D of the previous embodiment will be performed subsequently.

In the above example, the setting of the reference vehicle speed values in response to the integrated value of the engine revolutions N is performed in steps 251 through 259. However, it is also possible to design the setting of the reference speed values to be performed in the main loop of the calculation and the setting of the reference speed values may be performed at a low frequency of, for example, once per thousand times of the execution of the main loop. Moreover, it is possible to design the setting of the reference speed values to be performed at the initialization routine (step 20).

In the operations shown in FIGS. 3B(a) and 3B(b), the reference speed values which have been determined at one of the steps 255 through 259 in response to the integrated values of the engine revolutions N will be set at steps 37', 41', 45', 47', 51' and 53' respectively, As in the previous embodiment, the data values at the step 36 are determined to be higher than the data values at the step 37'. Also, the data values at the step 40 are determined to be higher than the data values at the step 41', the data values at the step 45' are determined to be higher than the data values at the step 47', and the data values at the step 51' are determined to be higher than the data values at the step 53'. Since the other steps of the operation of this embodiment are the same as the previous embodiment, explanation thereof will not be repeated.

It will be appreciated from the foregoing, in the case of the second embodiment of the shift operation indication method according to the present invention, the reference vehicle speed values are set so that the values are changed to lower speeds as the integrated value of the number of engine revolutions increases. Therefore, the reference vehicle speed values for the indication of shift operation of the manual gearbox are changed to proper values sooner as the frequency of the high speed rotation of the engine, that is, a driving manner by which the break-in period is shortened, increases. Thus, both the driveability and the fuel economy can be secured satisfactorily.

Figure 4:
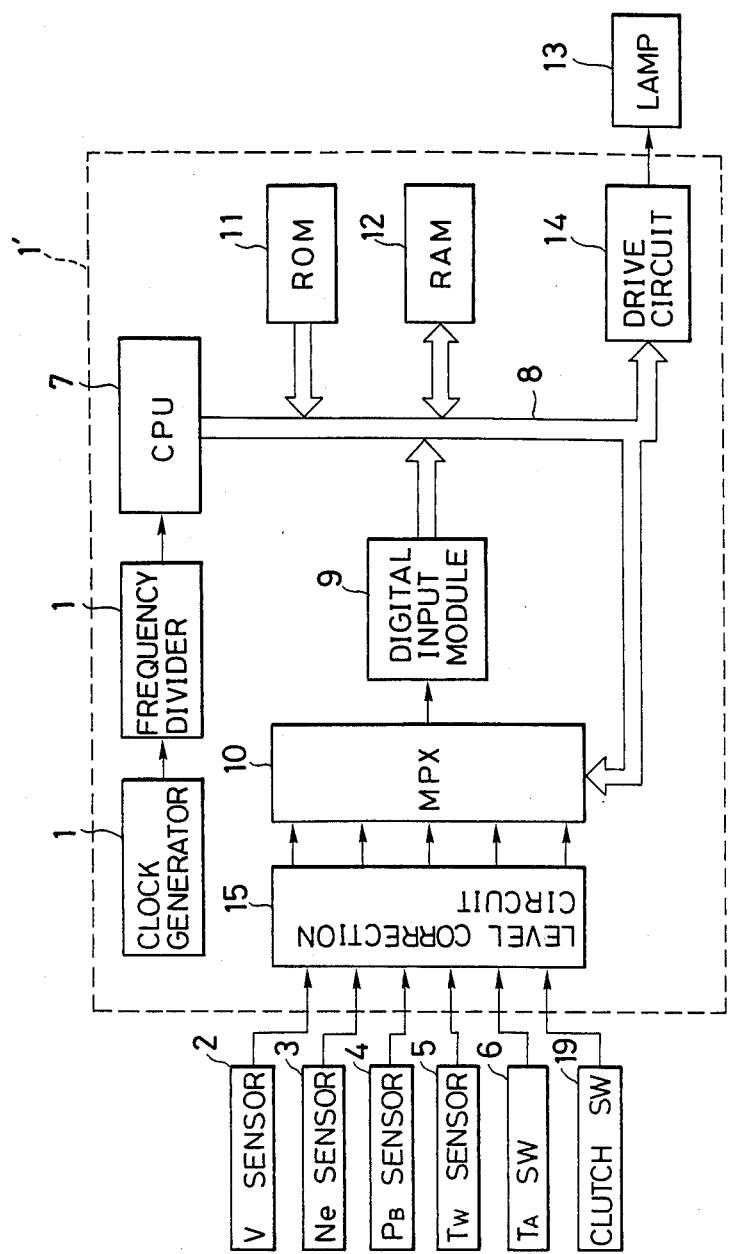
FIG. 4 is a block diagram showing another example of the control system in which a third embodiment of the indication method according to the present invention is adopted.
Figure 5A:
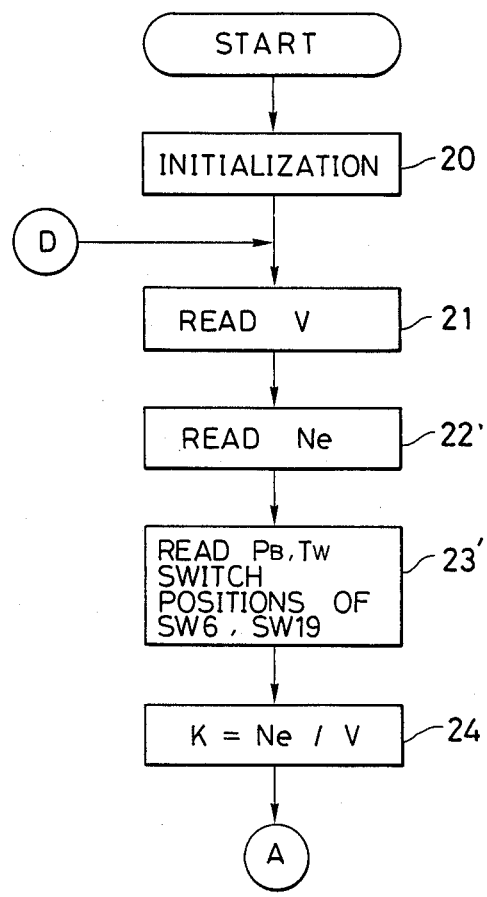
FIGS. 5A, 5B, 5C(a), and 5C(b) are flowcharts illustrating steps of the third embodiment of the indication method.
Figure 5B:
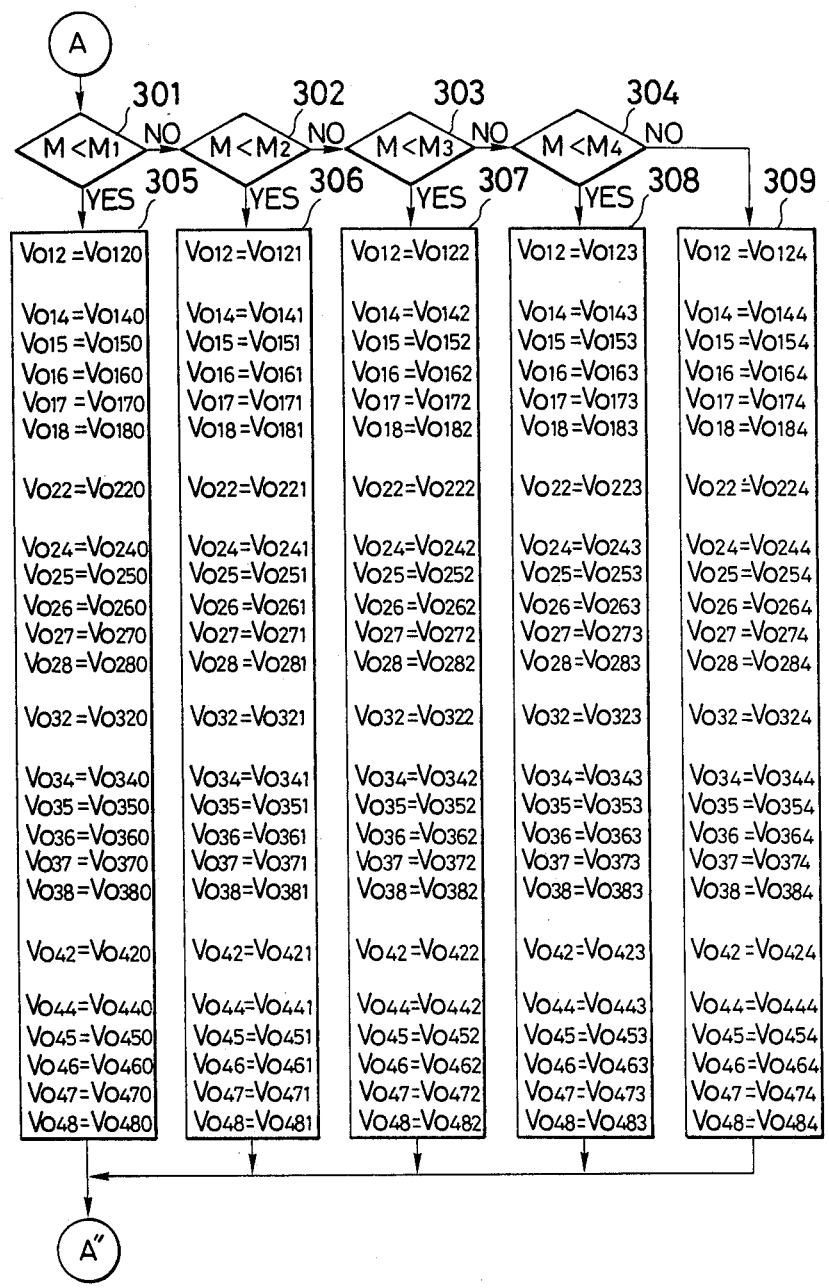

Referring to FIGS. 4, 5A, 5B(a) and 5B(b), the third embodiment of the present invention will be explained.

FIG. 4 is a block diagram of a control system which is constructed substantially the same as the control system shown in FIG. 1. The control system of this embodiment is characterized by a provision of the clutch switch 19 which turns on when a clutch pedal (not shown) of the vehicle is depressed, to disengage the clutch. An output signal of the clutch switch 19 is supplied to the level correction circuit 15 together with output signals of the sensors 2 through 5, and the $T_A$-switch 6. In this embodiment, the control circuit generally indicated at 1' in FIG. 4 determines the operational state of the vehicle from the output signals of the sensors 2 through 5, and the switches 6 and 19, and indicates the necessity of an up-shift operation of the manual gearbox by lighting of the lamp 13.

The operation of the control circuit 1' which substantially corresponds to the operation of the previous embodiment will be explained hereinafter.

FIG. 5A shows a part of the steps of the third embodiment which corresponds to the steps shown in FIG. 2A of the first embodiment. At a step 23' on/off output signals of the $T_A$ switch and the clutch switch 19, and analog output signals of the $P_B$ sensor 4 and the $T_W$ sensor 5 are read at intervals (400m sec, for example) longer than the interval of the starting of the program. Then, the gear position K is calculated at the step 24 as in the case of the previous embodiments. After the calculation of the gear position K at the step 24, an integrated value M of the number of times that the manual gearbox has been shifted, obtained from the count value in the counter of the RAM 12, incremented in response to turning on of the clutch switch 19, will be compared with several reference values. First, whether or not the integrated value of the shift times M is smaller than a reference value $M_1$(8000 times, for example) is detected at a step 301. Further, the integrated value of the shift times M is compared with reference values $M_2$ (16000 times, for example), $M_3$ (24000 times, for example), and $M_4$ 30000 times, for example) in a similar manner, at steps 302 through 304 respectively. After the comparison of the shift times, each data value of reference vehicle speed values $V_{012}$, $V_{014}$ through $V_{018}$, $V_{022}$, $V_{024}$ through $V_{028}$, $V_{032}$, $V_{034}$ through $V_{038}$, $V_{042}$, and $V_{044}$ through $V_{048}$, corresponding to each driving mode of the vehicle, and each gear position are set at steps 305 through 309, as shown in FIG. 5B, for each integrated value of the shift times. The reference vehicle speed values $V_{012}$, $V_{014}$ through $V_{018}$, $V_{022}$, $V_{024}$ through $V_{028}$, $V_{032}$, $V_{034}$ through $V_{038}$, $V_{042}$, and $V_{044}$ through $V_{048}$, are determined such that their values are lowered as the integrated value of shift times M increases. Although the reference vehicle speed values are set to be stepwise in the above example, it is also possible to determine those values so that they vary in a continuous manner in response to the integrated value of the number of shift operations M. Further, regarding the reference vehicle speed values $V_{011}$, $V_{021}$, $V_{031}$ and $V_{041}$, $V_{013}$, $V_{023}$, $V_{033}$ and $V_{043}$ corresponding to a particular operational mode of the vehicle, the determination of data values according to the integrated value of the shift times M will not be performed.

After the determination of the reference vehicle speed values by steps 301 through 309, the program goes to the step 25 of FIG. 5C(a) so that operations which are the same as the operations shown in FIGS. 2C(a), 2C(b), and 2D of the previous embodiment will be performed subsequently.

In the above example, the setting of the reference vehicle speed values in response to the integrated value of the number of shift operations M of the manual gearbox is performed through steps 301 through 309. However, it is also possible to design the setting of the reference speed values to be performed in the main loop of the calculation and the setting of the reference speed values may be performed at a low frequency of, for example, once a thousand times of the execution of the main loop. Moreover, it is possible to design the setting of the reference speed values to be performed at the initialization routine (step 20).

Figure 5C:
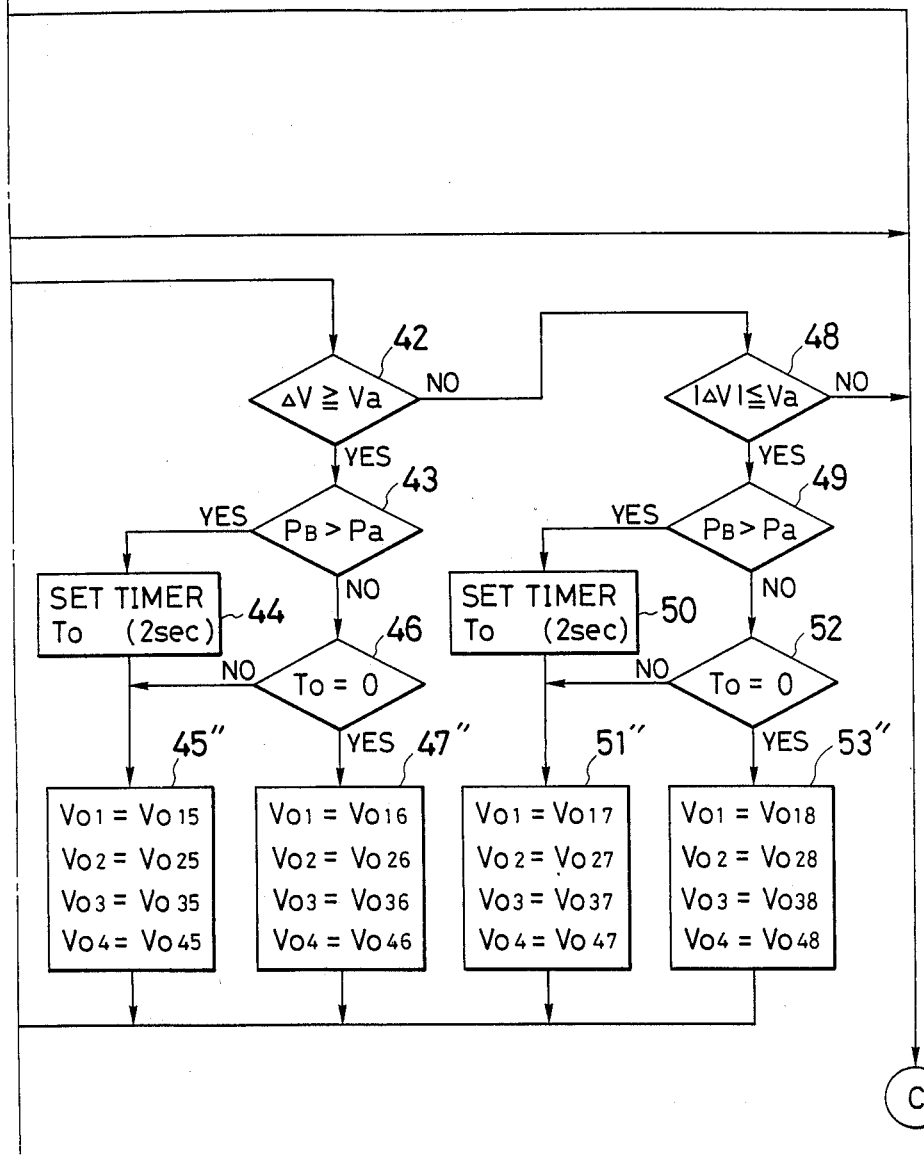

In the operations shown in FIGS. 5C(a) and 5C(b), the reference speed values which have been determined at one of the steps 305 through 309 in response to the integrated value of the shift times M of the manual gearbox will be set at steps 37'', 41'', 45'', 47'', 51'' and 53'' respectively. As in the previous embodiment, the data values at the step 36 are determined to be higher than the data values at the step 37''. Also, the data values at the step 40 are determined to be higher than the data values at the step 41'', the data values at the step 45'' are determined to be higher than the data values at the step 47'', and the data values at the step 51'' are determined to be higher than the data values at the step 53''. Since the other steps of the operations of this embodiment are the same as the previous embodiment, the explanation thereof will not be repeated.

In the embodiment explained above, the shift times of the manual gearbox is detected as the number of times that the output signal level of the clutch switch 19 changes. However, it is also possible to provide a switch which turns on at every switch position of the manual gearbox, and the number of times of the closure of the switch may be utilized as information of shift times of the manual gearbox.

It will be appreciated from the foregoing, in the case of the third embodiment of the shift operation indication method according to the present invention, the reference vehicle speed values are determined in response to the integrated value of the shift times of the manual gearbox. Therefore, the reference vehicle speed values for the shift operation of the manual gearbox are changed to proper values in a relatively short time. Therefore, both the driveability and the fuel economy can be secured satisfactorily. Moreover, when the engine is operating at a very low temperature, the reference vehicle speed values are sufficiently high. Therefore, the driveability of the vehicle is maintained without effecting the break-in correction.

Above, the indication method according to the present invention has been described by way of examples in which the necessity of the up-shifting of a manual gearbox is indicated. However, it is to be noted that the indication method of the down-shift operation can be also established in a similar manner.

What is claimed is:

1. A method of indicating to an operator when a manual gearbox of a motor vehicle should be shifted, comprising the steps of:
   (a) determining the cumulative running time of the vehicle;
   (b) setting reference values for a plurality of vehicle reference speeds based on the determined cumulative vehicle running time;
   (c) detecting a vehicle speed;
   (d) determining an operational parameter of an engine of the vehicle;
   (e) selecting one of said plurality of vehicle reference speeds based on the determined operational parameter of the engine;
   (f) comparing said detected vehicle speed with said selected vehicle reference speed; and
   (g) indicating to the operator that the manual gearbox should be shifted based on the result of the comparison.

2. A method set forth in claim 1, wherein said operational parameter relates to the operating temperature of the engine, said selected vehicle reference speed being higher when said operating temperature is below a predetermined value, and lower when said operating temperature is above a predetermined value.

3. A method as set forth in claim 1, wherein said step for determining the cumulative running time of the vehicle comprises the step of detecting the integrated mileage of the vehicle, said running time of the vehicle being determined on the basis of the detected integrated mileage of the vehicle.

4. A method as set forth in claim 1, wherein said step for determining the cumulative running time of the vehicle comprises the step of detecting an integrated value of the number of revolutions of the engine, said running time of the vehicle being determined on the basis of said integrated value of the number of engine revolutions.

5. A method as set forth in claim 1, wherein said step for determining the cumulative running time of the vehicle comprises the step of detecting an integrated value of the number of shift operations of said manual gearbox, said running time of the vehicle being determined on the basis of said integrated value.

6. A method set forth in claim 5, wherein said step of detecting said integrated value includes the further step of detecting engagement and disengagement of a clutch of the vehicle.

* * * * *